United States Patent Office 3,767,675
Patented Oct. 23, 1973

3,767,675
BASIC THIENYLALKANES
Klaus Posseli, Bergen-Enkheim, and Heribert Offermanns, Grossauheim, Germany, assignors to Deutsche Gold- und Silber-Scheideanstalt vormals Roessler, Frankfurt, Germany
No Drawing. Filed Sept. 20, 1971, Ser. No. 182,192
Claims priority, application Austria, Oct. 14, 1970, A 9,277/70
Int. Cl. A61k 27/00; C07d 63/12
U.S. Cl. 260—332.3 R
9 Claims

ABSTRACT OF THE DISCLOSURE

Compounds are prepared having the formula

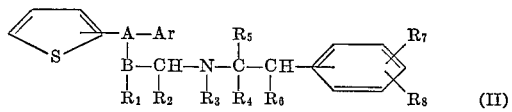

where the thienyl group can be substituted by one or more lower alkyl groups, Ar is a thienyl or phenyl group which can be substituted by one or more lower alkyl or lower alkoxy groups, $R_1$, $R_2$, $R_3$, $R_4$ and $R_5$ are hydrogen or lower alkyl, $R_6$ is hydrogen or hydroxyl and $R_7$ and $R_8$ are the same or different and are hydrogen, hydroxyl, halogen, lower alkyl, lower haloalkyl or lower alkoxy and their salts. The compounds can exist in optically active and diastereomeric form or a racemic mixture. They are useful in heart and circulatory illnesses.

The present invention is directed to new compounds of the formula

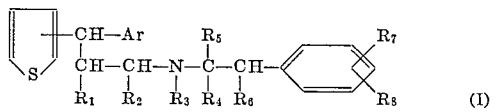

where the thienyl group is unsubstituted or is substituted by one or more lower alkyl groups, Ar is a thienyl or phenyl group which is unsubstituted or is substituted by one or more lower alkyl or lower alkoxy groups, $R_1$, $R_2$, $R_3$, $R_4$ and $R_5$ are hydrogen or lower alkyl, $R_6$ is hydrogen or hydroxyl and $R_7$ and $R_8$ are the same or different and are hydrogen, hydroxyl, halogen, lower alkyl, lower haloalkyl or lower alkoxy and their salts, especially their pharmacologically acceptable salts. The compounds also exist in optically active or diastereomeric forms. The alkyl, haloalkyl and alkoxy groups have 1 to 6 carbon atoms, preferably 1 to 4 carbon atoms. Of the halogen atoms fluorine, chlorine and bromine can be mentioned. An example of a haloalkyl group is the trifluoromethyl group. The alkyl groups are preferably straight chain.

The compounds of the invention are pharmacologically active, especially in circulatory illnesses. They increase the peripheral and cerebral blood flow and are therefore suited to raise the cerebral and muscle blood flow. Besides they cause a widening of coronary vessels. They are useful in human or veterinary medicine, e.g. in treating dogs and cats.

The compounds of the invention, particularly in the form of their salts, also can be used to cure melamine-formaldehyde resins.

The production of the compounds of the invention can be carried out, for example, if there is reacted in known manner a compound of the formula (or a salt of such compound)

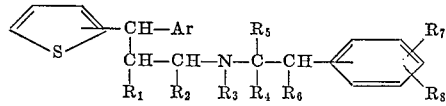
(II)

where A—$BR_1$— has the structure $>C=CR_1$ or $$>C(OH)—CHR_1$$

Ar, $R_1$, $R_2$, $R_3$, $R_4$, $R_5$, $R_6$, $R_7$ and $R_8$ being as defined above, with a reducing agent, in a given case in the presence of a dehydrating agent. Many of the compounds of Formula II are disclosed in Thiele et al. application 80,456 filed Oct. 13, 1970 and Thiele et al. Pat. 3,330,825. The remainder can be prepared by the method disclosed in the Thiele application and Thiele patent. The entire disclosure of the Thiele et al. application and Thiele et al. patent are hereby incorporated by reference.

In the production of compounds of Formula II frequently there is obtained a mixture of the tertiary alcohol (A—$BR_1$— is $>C(OH)—CHR_1$) and the corresponding unsaturated compound (A—$BR_1$— is $$>C=CR_1)$$

This type of mixture can likewise be used for the production of compounds of Formula I according to the above-stated process.

The reduction can be carried out, for example, with hydrogen in the presence of hydrogenation catalysts, suitably in a solvent such as alcohols, e.g. ethyl alcohol, methyl alcohol or isopropyl alcohol, dioxane, benzene, acetic acid, ethyl acetate, etc. As hydrogenation catalysts noble metal catalysts such as palladium, rhenium, platinum, etc. or catalytic sulfides such as palladium sulfide, platinum sulfide, rhenium heptasulfide and the like. The catalysts can be used with or without carriers. As carriers there can be used for example barium sulfate, aluminium oxide, silica gel, etc. The hydrogenation is carried out conveniently at temperatures between 20 and 100° C. at normal or elevated pressures, for example up to 100 atmospheres absolute. Preferably the pressure is between 2 and 20 atmospheres.

Furthermore as the reducing agent there can be used nascent hydrogen, for example metallic sodium in a lower alcohol, e.g. methanol, ethanol or propanol, with or without the addition of water, sodium in liquid ammonia, sodium amalgam in the presence of an acid such as dilute hydrochloric acid, dilute sulfuric acid or acetic acid. The reaction can be carried out in general at room temperature or elevated temperature up to about 150° C.

Furthermore, for example, it is also possible to carry out the reduction electrolytically or with other hydrogen forming agents such as complex metal hydrides, for example alkaliborohydrides, e.g. soduim borohydride, lithium alanate, sodium bis (2 - methoxyethoxy)-aluminum hydride in the presence of hydrogenation catalysts.

If there is present as the starting materials compounds of Formula II in which A—$BR_1$— has the structure $>C(OH)—CHR_1$— it is frequently recommended to simultaneously add dehydrating materials. As dehydrating agents there can be used, for example, mineral acids such as sulfuric acid or hydrohalic acids, e.g. hydrochloric acid, hydrobromic acid and hydroiodic acid, organic acids such as oxalic acid, formic acid, p-toluene sulfonic acid, thionyl chloride, aluminum chloride, zinc chloride, tin chloride, boron trifluoride, potassium hydrogen sulfate, aluminum oxide, phosphorus pentoxide and acid chlorides, e.g. acetyl chloride. Especially preferred as the reducing agent is nascent hydrogen in an acid medium.

The basic compounds in a given case can be converted into the acid addition salts by known methods. As anions for the salts there can be used the known and therapeutically acceptable acid groups. Thus there can be used salts of hydrochloric acid, maleic acid, malonic acid, acetic acid, lactic acid, fumaric acid, hydrobromic acid, succinic acid, p-toluene sulfonic acid, sulfuric acid, citric acid, etc.

Those compounds which contain asymmetric carbon atoms and as a rule precipitate as racemats can in known way, for example, by means of optically active acids, be split into the optically active isomers. However, it is also possible from the outset to use optically active or diasteromer starting materials whereby there is obtained in the final product a correspondingly pure optically active form or diastereomer configuration.

The production of starting materials of Formula II can be carried out, for example, if there is reacted in known manner a compound of the formula

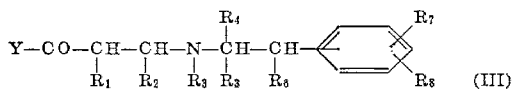

where Y is chlorine, bromine, an alkoxy group, the Ar group or a thienyl group and where $R_1$ through $R_8$ are as defined above with the corresponding thienyl or phenyl metal compound (for example lithium or Grignard compounds, e.g. thienyl lithium, phenyl lithium, thienyl magnesium chloride, thienyl magnesium bromide, phenyl magnesium chloride and phenyl magnesium bromide), in a given case in excess in inert solvents such as dialkyl ethers, e.g. diethyl ether, tetrahydrofuran, hydrocarbons, e.g. benzene, etc. at a temperature between $-100°$ C. and $+100°$ C. When thienyl-(3) metal compounds are reacted the reaction goes most favorably below $-40°$ C., for example at $-70°$ C.

If compounds are obtained thereby in which the group $>A-BR_1-$ is the group $>C(OH)-CHR_1-$ then these can in a given case be converted with water splitting agents into the corresponding unsaturated compounds having the group $>C=CR_1-$. The splitting out of water is carried out suitably at elevated temperatures, for example in the temperature range of 20 to 150° C. Preferably solvents are used as, for example, glacial acetic acid, benzene dioxane, etc. As agents for splitting out water there can be used, for example, mineral acids such as sulfuric acid or hydrohalic acids, e.g. hydrochloric acid and hydrobromic acid, organic acids such as oxalic acid, formic acid and p-toluene sulfonic acid, thionyl chloride, aluminum chloride, zinc chloride, stannic chloride, boron trifluoride, potassium hydrogen sulfate, aluminum oxide, phosphorus pentoxide, acid chlorides, e.g. acetyl chloride, and red phosphorus+iodine in the presence of water.

Examples of preferred compounds within Formula I are:

(a) Compounds of Formula 1 wherein the thienyl group is unsubstituted and linked in the 2- or 3-position, Ar is an unsubstituted phenyl or thienyl-(2)-or thienyl-(3)- group, $R_1$ is hydrogen or an alkyl group having 1 to 3 carbon atoms, preferably methyl, $R_2$, $R_3$, $R_4$, $R_7$ and $R_8$ are hydrogen, $R_5$ is an alkyl group having 1 to 3 carbon atoms, preferably methyl, and $R_6$ is a hdyroxyl group.

(b) Compounds as set forth in (a) wherein the thienyl group is substituted once or twice, preferably in the alpha position, by an alkyl group, especially methyl, in case Ar is a phenyl group this can be substituted once or twice by a straight or branched chain alkyl group having 1 to 4 carbon atoms and $R_7$ can be a straight or branched chain alkyl group having 1 to 6 carbon atoms, especially methyl, or a halogen atom such as fluorine, chlorine or bromine, preferably chlorine, or an alkoxy group, preferably methoxy.

(c) Compounds as set forth in (a) and (b) wherein at least one thienyl group is linked in the 3-position.

The compounds of the invention are suited for the production of pharmaceutical compositions and preparations. The pharmaceutical compositions or medicines contain one or more of the compounds of the invention as active ingredients, in a given case in admixture with other pharmacologically active materials. The production of the medicines can be accomplished with the use of known and customary pharmaceutical carriers and additives.

The medicines can be employed enterally, parenterally, orally, perlingually or in the form of sprays.

Suitable carriers and assistants are shown for example in Ulmann's "Encyklopädie der Technischen Chemie," vol. 4 (1953), pp. 1–39; Journal of Pharmaceutical Sciences, vol. 52 (1963), pp. 918 and following, H.v. Czetsch-Lindenwald, "Hilfstoffe für Pharmazie und angrenzende Gebiete," as well as in Pharm. Ind., vol. 2, 1961, pp. 72 and following. The entire disclosure of these publications are hereby incorporated by reference.

Examples of such carriers and assistants are gelatin, sucrose, pectin, starch, methylcellulose, talcum, lycopodium, silica, lactose, cellulose derivatives, glucose, fructose, stearates, emulsifiers, plant oils, water, pharmaceutically compatible mono or polyvalent alcohols and polyethylene glycols such as ethyl alcohol, diethylene glycol, polyethylene glycol 400, ethylene glycol, propylene glycol, glycerine, sorbitol, mannitol, pentaerythritol as well as derivatives of such alcohols, dimethyl sulfoxide, esters of aliphatic saturated or unsaturated fatty acids, e.g. stearic acid, palmitic acid or oleic acid with mono or polyvalent alcohols such as glycols, e.g. ethylene glycol, glycerine, diethylene glycol, pentaerythritol, sorbitol, mannitol, etc., which in a given case can be etherified, benzyl benzoate, dioxolane, glycerine formal, glycolfurole, dimethyl acetamide, lactamide, ethyl lactate, ethyl carbonate, etc.

It is also possible to add preservatives, buffers, taste correctives, antioxidants and complex formers (for example, ethylenediaminetetracetic acid) and the like.

As antioxidants there can be used, for example, sodium meta bisulfite and ascorbic acid, as preservatives, for example, sorbic acid, ethyl ester of p-hydroxy-benzoic acid and similar materials.

The pharmaceutical preparations generally contain 1 to 50% of the active component of the invention, but as stated above can contain 100% of the active material.

Dispensing as indicated above can be in the form of tablets, capsules, pills, dragées, plugs, liquids or aerosols. As liquids there can be used oily or aqueous solutions or suspensions. Preferred form of use are as tablets containing 10 to 100 mg. of active material or as solutions, e.g. aqueous solutions containing 0.2 to 2% of active materials.

The amount of the active component of the invention in the individual dosages, for example in dispensing orally is 30 mg., in dispensing intravenously 5 mg., always calculated on the free base. These dosages can be dispensed once or several times daily.

For example, 1 to 3 tablets containing 30 mg. of active material can be dispensed daily or, for example, a 2 ml. ampoule containing 5 mg. of active substance can be injected intravenously 1 to 3 times a day.

The compounds of the invention can be administered to mammals such as humans, dogs, cats, cattle, sheep, rats, mice, etc.

The acute toxicity of the compounds of the invention in mice (expressed as the $LD_{50}$ in mg./kg.) in oral application for example is for example 1200 mg./kg. (or above 500 mg./kg.).

The compounds of the invention when measuring the blood flow with an electromagnetic flowmeter in the vertebralis artery (cerebral) and femoralis artery (peripheral) on narcotized dogs show a good increase in the cerebral and peripheral blood flow.

The increase in cerebral and peripheral blood flow is comparable with the activity of the known medicine 3-hydroxymethyl pyridine.

The lowest effective dosage in the animal experiments set forth above, for example, is 5 mg./kg. orally and 0.1 mg./kg. intravenously.

As general dosage ranges for activity (based on the above animal experiments) there can be used 5–30 mg./kg. orally and 0.1–1 mg./kg. intravenously.

The compounds of the invention are useful in circulatory disturbances of various genesis, peripheral and cerebral blood disturbances, migraine, arteriosclerosis, Raynaud's disease, ulcus cruris, Sudeckish syndrome, encephalo malacia.

The compounds of the invention tested on isolated guinea pig heart following the method of Langendorff (Pflügers Arch., 61, 291 (1895)) showed a good increase in coronary blood flow.

This activity is comparable with that of the known agent papaverine.

As general dosage range for the activity in the above-mentioned experiments there can be used 5 to 500 μg./heart.

The compounds of the invention are indicated for use in coronary insufficiency, angina pectoris and myocardic infarct.

The dosage for humans generally is in the range of 1 to 100 mg. of active material one or more times a day.

Unless otherwise indicated all parts and percentages are by weight.

EXAMPLE 1

1-[1,1-dithienyl-3-propyl-(3)]-[1-phenyl-1-hydroxypropyl-(2)]-amine

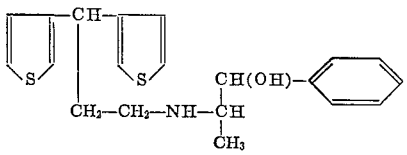

20 grams of 1 - [1,1-dithienyl-(3)-propen-(1)-yl-(3)]-[1-phenyl-1-hydroxypropyl-(2)]-amine were suspended in 250 ml. of ethanol and hydrogenated at room temperature at 5 atmospheres absolute hydrogen pressure in the presence of 40 grams of 5% palladium/barfium sulfate until the calculated amount of hydrogen was taken up, whereby the material went into solution. After filtering off the catalyst the solution was distilled. The base remaining behind (M.P. 94° C.) was dissolved in hot acetone, filtered and converted into the hydrochloride with isopropanolic HCl which was recrystallized from ethanol. M.P. 237° C., yield 5 grams.

The starting material was produced as follows:

The 3-thienyl lithium solution was prepared from 16 grams (0.25 mol) of n-butyllithium in 167 ml. of n-hexane and 40.7 grams (0.25 mol) of 3-bromo-thiophene at —70° C. To this solution there was added 25.1 grams (0.1 mol) of 1-β-[1-phenyl-1-hydroxypropyl-(2)-amino]-propionic acid ethyl ester in 100 ml. of absolute ether and held at —70° C. for 30 minutes. After gradually warming to —10° C. it was decomposed with 100 ml. of water, the organic phase separated, dried with potassium carbonate, filtered and neutralized with isopropanolic HCl. The 1-[1,1-dithienyl-(3)-1-hydroxypropyl-(3)]-[1-phenyl-1-hydroxypropyl-(2)]-amine. HCl in 100 ml. of chloroform was treated with HCl gas until the entire material went into solution. The solvent was distilled off, the residue treated with 10% soda lye, the base taken up in ether and neutralized with isopropanolic HCl. The base was set free from the 1-[1,1-dithienyl-(3)-propen-(1)-yl-(3)]-[1-phenyl-1-hydroxypropyl-(2)]-amine. HCl (M.P. 225° C.) by treating it with 20% soda lye and the base was recrystallized from isopropanol, M.P. 124° C.

EXAMPLE 2

1-[1,1-dithienyl-(2)-propyl-(3)]-[1-phenyl-1-hydroxylpropyl-(2)]-amine

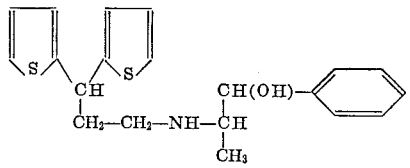

The base was set free as an oil from 13 grams of 1-[1,1-dithienyl-(2) - 1 - hydroxypropyl-(3)]-[1-phenyl-1-hydroxy-propyl-(2)]-amine maleate by treatment with 20% soda lye and hydrogenated in 200 ml. of ethanol in the presence of 10 grams of 10% palladium/barium sulfate at room temperature and 6 atmospheres absolute hydrogen pressure. The solution was filtered, the solvent distilled off, the base remaining behind (M.P. 198° C.) dissolved in acetone/ethanol (1:1 by volume) and converted into the hydrochloride with isopropanolic HCl. It had a melting point of 201° C. after recrystallization from isopropanol, yield 4 grams. In order to form the starting material 1 mol of 1-β-[1-phenyl-1-hydroxypropyl-(2)-amino]-propionic acid ethyl ester reacted with 2 mols of 2-thienyl magnesium bromide in ether at the boiling point. After decomposition with aqueous ammonium chloride solution the oily base was obtained which was converted by maleic acid to the maleate in ether, M.P. 137–138° C.

EXAMPLE 3

1-[1-thienyl-(2)-1-thienyl-(3)-propyl-(3)]-[1-phenyl-1-hydroxypropyl-(2)]-amine

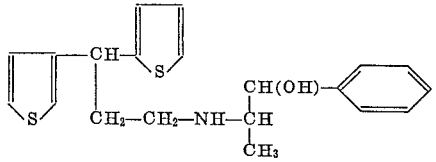

The base (M.P. 86° C.) was set free from 14 grams of 1-[1-thienyl-(2)-1-thienyl - (3) - propen-(1)-yl-(3)]-[1-phenyl-1-hydroxypropyl-(2)]-amine. HCl by treatment with 20% soda lye and hydrogenated in 300 ml. of ethanol in the presence of 40 grams of 5% palladium/barium sulfate at 20° C. and 6 atmospheres absolute hydrogen pressure. The solution was filtered and the solvent distilled off. The base remaining behind (M.P. 82° C.) was dissolved in boiling acetone and converted into the hydrochloride with isopropanolic HCl. The hydrochloride was recrystallized from isopropanol, M.P. 231° C., yield 6 grams.

In order to form the starting material 1-β-[1-phenyl-1-hydroxy-propyl - (2) - amino]-propiothienone-(3) was reacted with 2-thienyl magnesium bromide in ether at the boiling point. After decomposition with aqueous ammonium chloride solution there was obtained 1-[1-thienyl-(2)-1-thienyl-(3)-1-hydroxypropyl-(3)]-[1-phenyl - 1 - hydroxypropyl-(2)]-amine that was converted by treatment with HCl gas into the above-employed hydrochloride (M.P. 206-207° C.).

EXAMPLE 4

1-[1-thienyl-(3)-1-phenylpropyl-(3)]-[1-phenyl-1-hydroxypropyl-(2)]-amine

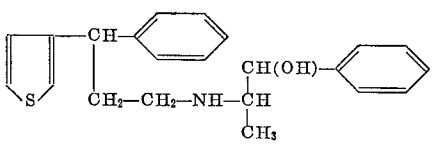

The free base (as an oil) was set free from 10 grams of 1-[1-thienyl-(3)-1-phenyl - 1 - hydroxypropyl(3)]-[1-phenyl - 1 - hydroxypropyl-(2)]-amine. HCl by treatment with 20% soda lye and hydrogenated in 150 ml. of ethanol in the presence of 20 grams of 5% palladium/barium sulfate at 20° C. and 5 atmospheres absolute hydrogen pressure. The solution was filtered, the solvent distilled off, the base (oil) remaining behind dissolved in acetone and converted into the hydrochloride with isopropanolic HCl. After recrystallization from isopropanol it had a melting point of 228° C., yield 2 grams.

In order to form the starting material 1-β-[1-phenyl-1-hydroxypropyl-(2)-amino]-propiothienone-(3) was reacted with phenyl magnesium bromide in ether at the boiling point. The oily base obtained after decomposition with aqueous ammonium chloride solution was converted into hte hydrochloride (M.P. 214–215° C.) with isopropanolic HCl.

EXAMPLE 5

1-[1-thienyl-(2)-1-phenylpropyl-(3)]-[1-phenyl-1-hydroxypropyl-(2)]-amine

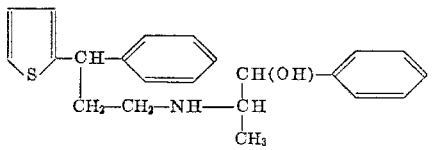

The base (M.P. 112° C.) set free from 10 grams of 1 - [1 - thienyl-(2)-1-phenyl-propen-(1)-yl-(3)]-[1-phenyl-1-hydroxy-propyl-(2)]-amine. HCl by treatment with 20% soda lye was hydrogenated in 200 ml. of ethanol in the presence of 8 grams of 10% palladium/barium sulfate at 20° C. and 6 atmospheres absolute hydrogen pressure. The solution was filtered and the solvent distilled off. The base remaining behind (M.P. 227° C.) was dissolved in a boiling acetone-ethanol mixture (2:1 by volume) and converted into the hydrochloride with isopropanolic HCl. After recrystallization from isopropanol the hydrochloride had a melting point of 231° C., yield 3 grams.

EXAMPLE 6 d,l-[1-phenyl-1-thienyl-(2)-propyl-(3)]-[1-(4-chlorophenyl)-propyl-(2)]-amine

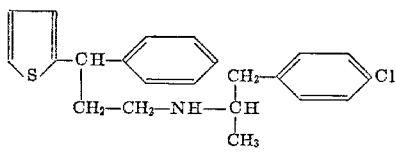

The free base (oil) was set free from 20 grams of d,l-[1 - phenyl - 1 - thienyl-(2)-propen-(1)-yl-(3)]-[1-(4-chlorophenyl)-propyl-(2)]-amine. HCl by treatment with 20% soda lye and hydrogenated in 300 ml. of ethanol in the presence of 40 grams of 5% palladium/barium sulfate at 20° C. and 6 atmospheres absolute hydrogen pressure. After filtering the solution and distilling off the solvent the base (M.P. 186° C.) was obtained which was dissolved in boiling acetone and converted to the hydrochloride with isopropanolic HCl. The hydrochloride had a melting point of 202° C. after recrystallization from isopropanol, yield 5 grams.

EXAMPLE 7 d,l-[1,1-dithienyl-(3)-propyl-(3)]-[1-phenyl-1-hydroxypropyl-(2)]-amine

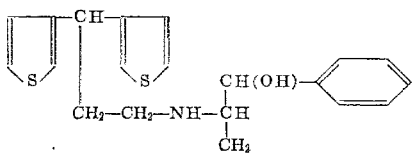

10 grams of d,l-[1,1-dithienyl-(3)-1-hydroxypropyl-(3)]-[1-phenyl-1-hydroxypropyl-(2)]-amine were hydrogenated in 300 ml. of ethyl acetate in the presence of 10 grams of 10% palladium/barium sulfate at 45° C. and 6 atmospheres absolute hydrogen pressure. The solution was filtered and neutralized with isopropanolic HCl, whereupon the HCl salt precipitated. It had a melting point of 203–204° C. after recrystallization from isopropanol, yield 5 grams.

EXAMPLE 8 d,l-[1,1-dithienyl-(3)-propyl-(3)]-[1-(4-fluorophenyl)-1-hydroxypropyl-(2)]-amine

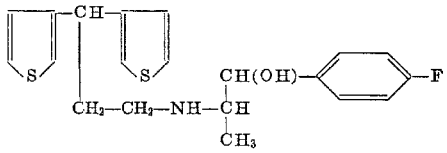

3 grams of d,l-[1,1-dithienyl-(3)-propen-(1)-yl-(3)]-[1-(4-fluorophenyl)-1-hydroxypropyl-(2)]-amine. HCl in 50 ml. of ethanol were hydrogenated in the presence of 0.5 gram of 10% palladium/activated carbon at 70° C. and 6 atmospheres absolute hydrogen pressure. The hot reaction solution was filtered off from the catalyst and the solvent distilled off. The HCl salt remaining behind was recrystallized from ethanol, M.P. 216–218° C., yield 2 grams.

The starting material was produced in the manner described in Example 1 from d,l-β-[1-(4-fluorophenyl)-1-hydroxypropyl-(2)-amina]-propanionic acid ethyl ester and 3-thienyllithium, M.P. 206° C.

In addition to the compounds mentioned in the specific examples above illustrative of other compounds within the invention that can be prepared in similar fashion are 1-[1,1-di(2-methylthienyl)-(3)-propyl]-[1-phenyl-1-hydroxypropyl-(2)]-amine,
d,l-[1-(5-isopropyl)-thienyl-(2)-1-thienyl-(3)-propyl-(3)]-[1-phenyl-1-hydroxypropyl-(2)]-amine,
1-[1,1-di(2,5-dimethylthienyl)-(3)-propyl]-[1-p-tolyl-1-hydroxypropyl-(2)]-amine,
1-[1-thienyl-(2)-1-p-tolyl-propyl-(3)]-[1-m-xylyl-1-hydroxypropyl-(2)]-amine,
1-[1,1-dithienyl-(2)-(2-methyl)-propyl-(3)]-[1-phenyl-1-hydroxypropyl-(2)]amine,
1-[1,1-dithienyl-(3)-(2)-propyl)-propyl-(3)]-[1-(2-bromophenyl)-propyl-(2)]-amine,
1-[1,1-dithienyl-(3)-propyl-(3)]-[1-phenyl-1-hydroxyamyl-(2)]-amine,
d,l-[1,1-dithienyl-(2)-propyl-(3)]-[1-phenyl-1-hydroxyethyl-(2)]-amine,
1-[1,1-dithienyl-(3)-propyl-(3)]-[1-phenyl-1-hydroxypropyl-(2)]-N-methylamine,
d,l-[1-p-methoxyphenyl)-1-thienyl-(3)-propyl-(3)]-[1-4-hydroxyphenyl)-1-hydroxypropyl-(2)]-amine,
d,l-[1-(2)-sec. butyl-1-thienyl-(2)-propyl-(3)]-[1-(4-methoxyphenyl)-propyl-(2)]-amine,
1-[1,1-dithienyl-(3)-propyl-(3)]-[1-(4-hexylphenyl)-propyl(2)]-amine,
d,l,-[1,1-dithienyl-(2)-propyl-(3)]-[1-(4-trifluoromethyl-phenyl)-1-hydroxy-propyl-(2)]-amine,
1-[1,1-dithienyl-(3)-propyl-(3)]-[1-(2,4-dimethyl-phenyl)-1-hydroxypropyl-(2)]-amine,
1-[1,1-dithienyl-(3)-propyl-(3)]-[1-(2,4-dihydroxy-phenyl)-1-hydroxypropyl-(2)]-amine,
d,l-[1-phenyl-1-thienyl-(2)-propyl-(3)]-[1-(3-hydroxyphenyl)-propyl-(2)]-amine,
1-[1,1-dithienyl-(2)-propyl-(3)]-[1-(4-isobutylphenyl)-1-hydroxypropyl-(2)]-amine.

The compounds of the invention can be administered to mammals such as humans, dogs, cats, cattle, sheep, rats, mice, etc.

9

Following are examples which illustrate the production of pharmaceutical preparations.

EXAMPLE 9

Production of an injectable solution 10 grams of 1-[1-thienyl-(2)-1-thienyl-(3)-propyl-(3)]-[1-phenyl - 1 - hydroxypropyl-(2)]-amine hydrochloride were dissolved in the cold in a mixture of 200 grams of 96% ethanol and 800 grams of 1,2-propylene glycol. The solution was diluted with water to 2000 ml. for injection, passed through a bacteria destroying filter and filled into 2 ml. glass ampoules in known manner.

The production of the injectable solution takes place under sterile conditions. It is also possible to work under normal conditions and then to heat sterilize the filled ampoules. Each 2 ml. ampoule contained 10 mg. of the active material.

EXAMPLE 10

Production of an injectable solution 5.0 grams of 1-[1,1-dithienyl-(3)-propyl-(3)]-[1-phenyl-1-hydroxypropyl-(2)]-amine hydrochloride were dissolved in the cold in a mixture of 200 grams of 96% ethanol and 600 grams of 1,2-propylene glycol. The solution was diluted with water to 1000 ml. for injection, passed through a bacteria destroying filter and filled into 2 ml. glass ampoules in known manner.

The production of the injectable solution takes place under sterile precautions. It is also possible to operate under normal conditions and to heat sterilize the filled ampoules. Each 2 ml. ampoule contains 10 mg. of the active material.

EXAMPLE 11

Production of suppositories 25 grams of d,l-[1,1-dithienyl-(3)-propyl-(3)]-[1-phenyl-1-hydroxypropyl(2)]-amine hydrochloride were worked into 1975 grams of a melted suppository mass, for example Hartfett DAB7 (a hard fat which is a mixture of primarily saturated higher fatty acid glycerides) and in known manner poured into forms to make 2.0 gram suppositories. Each suppository contained 25 mg. of active material.

EXAMPLE 12

Production of tablets 10 grams of 1 - [1 - thienyl-(2)-1-thienyl-(3)-propyl-(3)-]-[1-phenyl-1-hydroxypropyl-(2)]-amine hydrochloride were granulated in known manner with 10.0 grams of microcrystalline cellulose and 124.5 grams of lactose with about 50 ml. of a 10% starch paste. The granules were dried and passed through a 1 mm. sieve and mixed with 40.0 grams of corn starch, 20.0 grams of talc, 10.0 grams of microcrystalline cellulose and 0.5 grams of highly dispersed silica and pressed in conventional manner into tablets weighing 220 mg. and having a diameter of 9 mm.

Each tablet contained 10 mg. of active material.

EXAMPLE 13

Production of gelatin stick capsules 250 grams of d,l - [1,1 - dithienyl-(3)-propyl(3)]-[1-phenyl - 1-hydroxypropyl-(2)]-amine hydrochloride were mixed with 250 grams of mannitol and granulated with 125 ml. of 96% ethanol, after drying passed through a 0.5 mm. mesh sieve and filled into gelatin stick capsules in individual amounts of 250 mg. As single dosages 1 to 2 capsules corresponding to 125 to 250 mg. of active material can be taken.

What is claimed is:

1. A compound having the formula

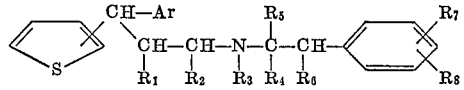

wherein the thienyl group is either unsubstituted or substituted by at least one lower alkyl group, Ar is a thienyl or phenyl group which is unsubstituted or substituted with at least one lower alkyl or lower alkoxy group, $R_1$, $R_2$, $R_3$, $R_4$ and $R_5$ are hydrogen or lower alkyl, $R_6$ is a hydroxyl group, and $R_7$ and $R_8$ are the same or different and are hydrogen, hydroxyl, halogen, lower alkyl, lower haloalkyl or lower alkoxy or a pharmacologically acceptbale salt of such compound.

2. A compound according to claim 1 wherein the first mentioned thienyl group is unsubstituted, Ar is unsubstituted phenyl or thienyl, $R_1$ is hydrogen or alkyl of 1 to 3 carbon atoms, $R_2$, $R_3$, $R_4$ $R_7$ and $R_8$ are hydrogen, $R_5$ is alkyl of 1 to 3 carbon atoms and $R_6$ is hydroxyl.

3. A compound according to claim 2 wherein $R_1$ is hydrogen or methyl and $R_5$ is methyl.

4. A compound according to claim 3 wherein at least one thienyl group is linked in the 3-position.

5. A compound according to claim 1 wherein the first-mentioned thienyl group is unsubstituted or has one or two lower alkyl groups, Ar is phenyl having one to two alkyl groups of 1 to 4 carbon atoms or is thienyl, $R_1$ is hydrogen or alkyl of 1 to 3 carbon atoms, $R_2$, $R_3$, $R_4$ and $R_8$ are hydrogen, $R_5$ is alkyl of 1 to 3 carbon atoms, $R_6$ is hydroxyl and $R_7$ is alkyl of 1 to 6 carbon atoms, fluorine or chlorine, or lower alkoxy.

6. A compound according to claim 5 wherein any alkyl group present in the compound is methyl and any methyl group attached to a thienyl group is in the alpha position and $R_7$ is methyl, chlorine or methoxy.

7. A compound according to claim 6 wherein at least one thienyl group is linked in the 3-position.

8. A compound according to claim 1 wherein the first-mentioned thienyl group is unsubstituted, Ar is unsubstituted thienyl or phenyl, $R_1$, $R_2$, $R_3$, $R_4$, $R_7$ and $R_8$ are hydrogen, $R_5$ is methyl and $R_6$ is hydroxyl.

9. A compound according to claim 1 wherein the first-mentioned thienyl group is unsubstituted, Ar is unsubstituted thienyl or phenyl, $R_1$, $R_2$, $R_3$, $R_4$ and $R_7$ are hydrogen, $R_5$ is methyl and $R_8$ is chlorine or fluorine.

References Cited

UNITED STATES PATENTS

| | | | |
|---|---|---|---|
| 3,330,825 | 7/1967 | Thiele et al. | 260—240 |
| 3,687,945 | 8/1972 | Thiele et al. | 260—240 R |
| 3,177,253 | 4/1965 | Ehrhart et al. | 260—570.5 |
| 3,262,977 | 7/1966 | Harsanyi et al. | 260—570 |

FOREIGN PATENTS

| | | | |
|---|---|---|---|
| 1,338,098 | 8/1963 | France | 260—329 |

OTHER REFERENCES

Klosa: Journal fur praktische Chemie, 34(5–6), 312–334 (1966).

HENRY R. JILES   Primary Examiner

C. M. S. JAISLE, Assistant Examiner

U.S. Cl. X.R.

260—67.6, 329 AM, 329 HS, 332.5; 424—275